United States Patent

Schwartzman

[15] 3,656,822
[45] Apr. 18, 1972

[54] SERVO-CONTROL GAS-LUBRICATED BEARING SYSTEM

[72] Inventor: Everett H. Schwartzman, 457 34th Street, Manhattan Beach, Calif. 90266

[22] Filed: Sept. 13, 1968

[21] Appl. No.: 759,615

[52] U.S. Cl. ............................................................. 308/122
[51] Int. Cl. ........................................................... F16c 1/24
[58] Field of Search ................................... 308/122, 9, 172

[56] References Cited

UNITED STATES PATENTS 2,788,862  4/1957  Langer....................................308/122

Primary Examiner—Martin P. Schwadron
Assistant Examiner—Frank Susko
Attorney—Nilsson, Robbins, Wills & Berliner

[57] ABSTRACT

A system is disclosed for supporting a rotary load on a cushion of gas that is developed in a gas-bearing structure. Both radial and thrust loads are carried in the system as disclosed, and similar principles are utilized in the operation of each such component structure. A closure member cooperates with a load member, carrying a rotary load, to define the space in which a gas cushion is developed. To preserve the space relationship between the load member and the closure member within operating limits, the two structures are position servo-controlled. As disclosed herein, signals are developed that are indicative of the relationship between the members thereby defining the chamber in which the gas cushion is provided. A servo-control structure receives those signals to control the flow of gas for preserving the desired positional relationship by applying impact or impinging gas forces. As disclosed, a plurality of opposing ports are provided to discharge gas, and thereby exert impact forces to preserve the bearing elements within operative relative positions.

5 Claims, 7 Drawing Figures

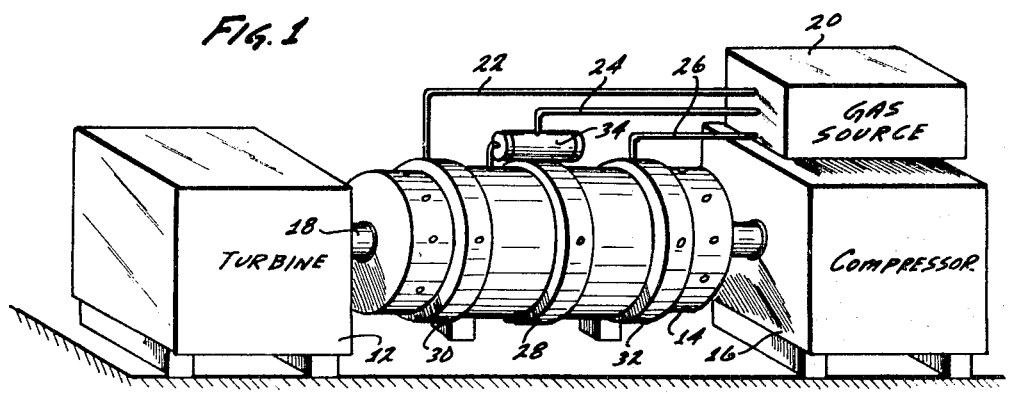
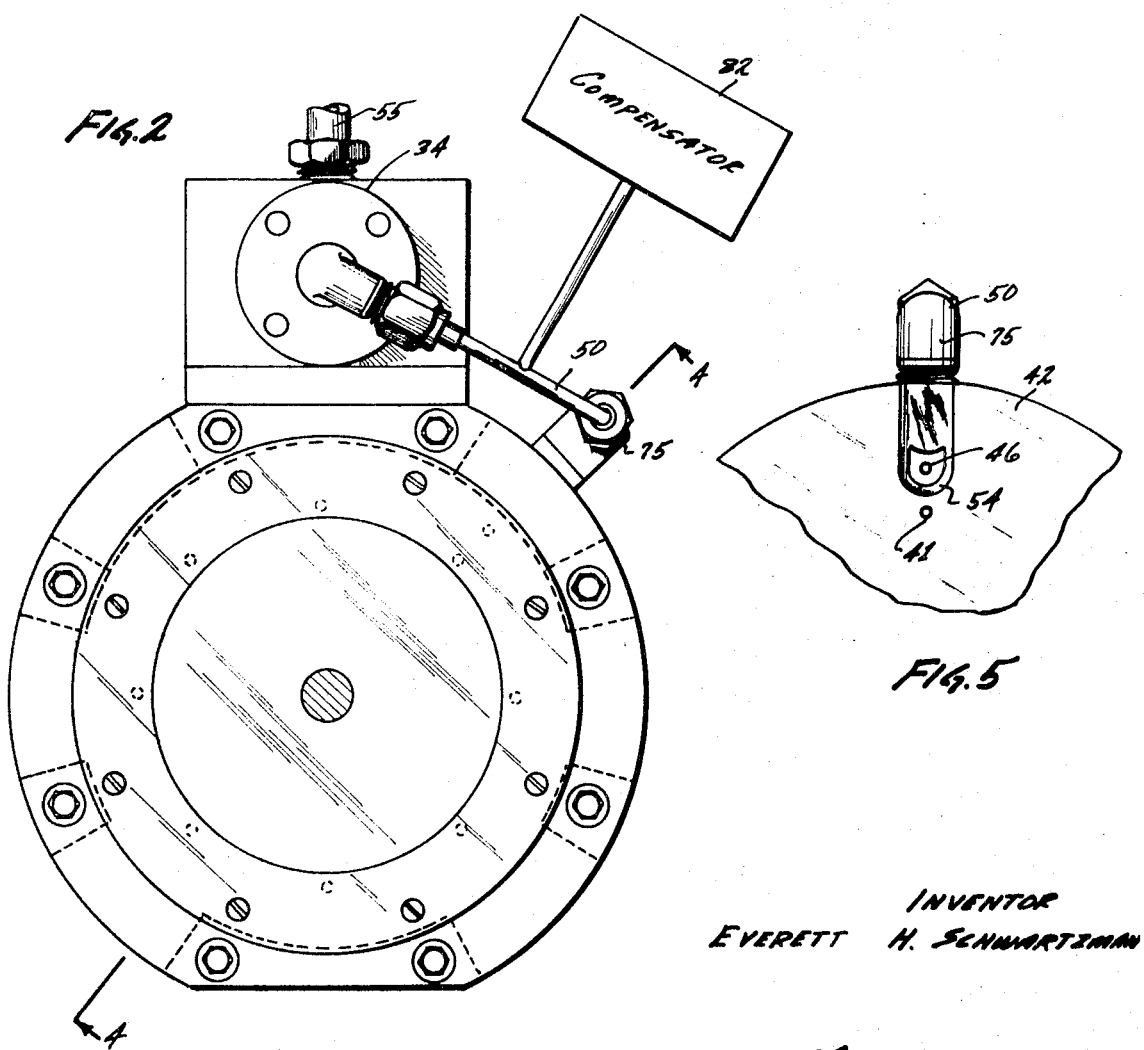

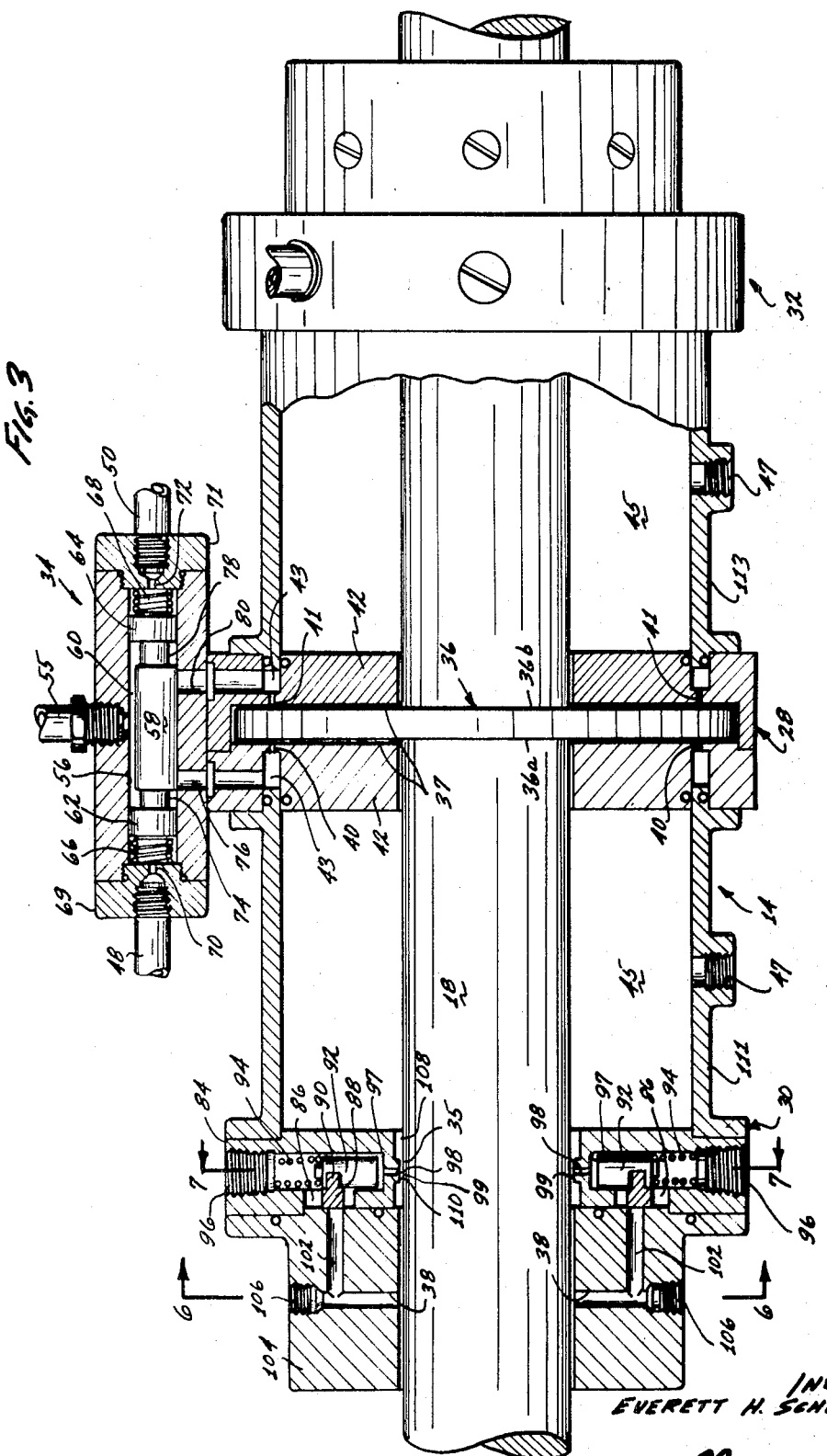

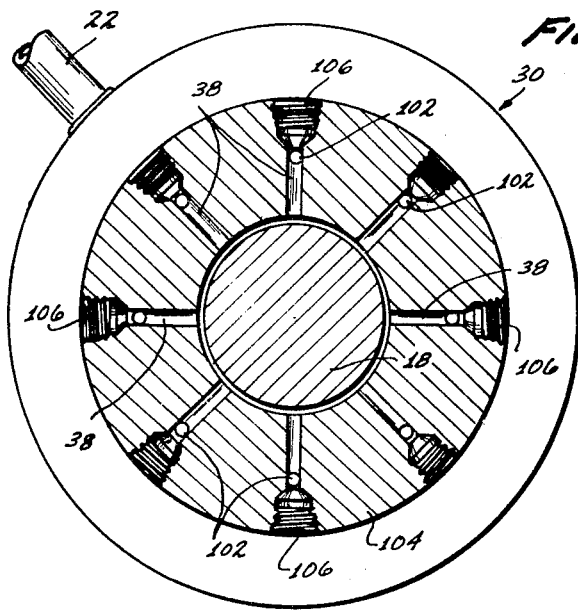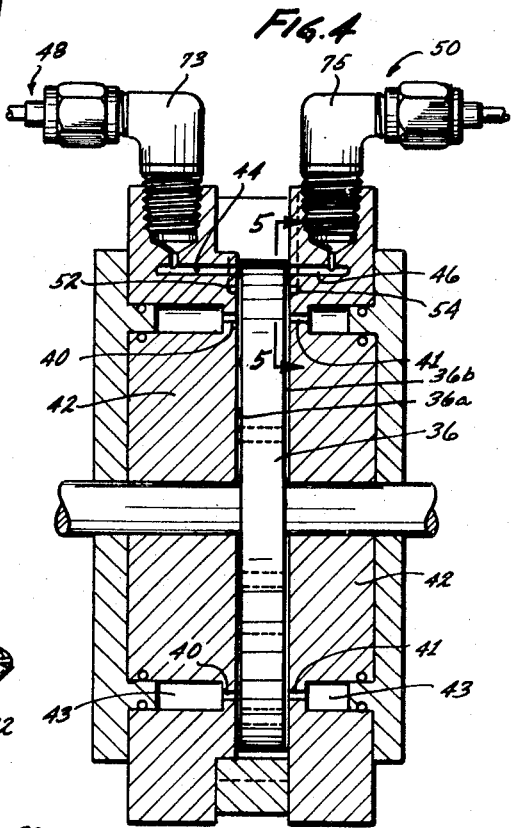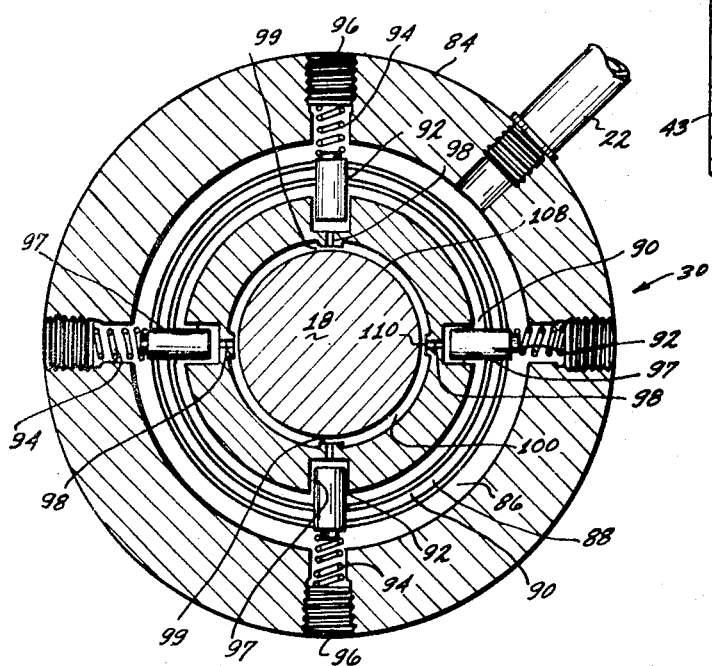

SERVO-CONTROL GAS-LUBRICATED BEARING SYSTEM

BACKGROUND AND SUMMARY OF THE INVENTION

In recent years, developments in certain technologies have substantially increased the need for gas-lubricated bearings. Specifically, for example, several artificial environments exist in which liquid lubricants as oil are intolerable. Radio-active environments, and extremely cold environments (as encountered in cryogenic systems) are representative of applications in which liquid lubricants present problems while gas-lubricated bearings can effectively support a rotary load. As another example, certain machines as in the textile industry require structures for supporting rotary loads yet the presence of any liquid lubricants, e.g. oils, is undesirable as a continual threat to the cleanliness of fibers and/or fabrics.

The many other areas of application for gas-lubricated bearings include almost any system presenting a need for high-speed low-friction, low-maintenance bearings. In this regard the incentive to employ gas-lubricated bearings is significantly increased in those situations where a satisfactory form of gas for use in a bearing is readily available, e.g. cryogenic systems.

Among the problems encountered with gas bearings of the pRior art has been those of their instability and their complexity. That is, prior gas bearings which have been substantially stable in operation, have also been rather complex and expensive requiring high-precision production techniques and demanding quality control. As a result, a considerable need exists for an improved gas-lubricated bearing which can be reliably manufactured by conventional production methods and which will provide high-performance, low-wear operation at relatively-high operating speeds. In general, the present invention resides in the structure of such a gas-lubricated bearing in which the relationship between the load-carrying member and the associated closure member (for cooperatively containing a gas cushion) is controlled by signals that are developed to indicate that positional relationship, which signals are applied to control fluid flow to directly preserve the desired positional relationship between those members.

BRIEF DESCRIPTION OF THE DRAWINGS

In the drawings which constitute a part of this specification, an exemplary embodiment demonstrating various objectives and features hereof is set forth, specifically, FIG. 1 is a perspective view of an apparatus incorporating the principles of the present invention;

FIG. 2 is an end view of the bearing portion of the structure of FIG. 1;

FIG. 3 is a partial vertical sectional view taken centrally through the bearing structure of FIG. 1;

FIG. 4 is a sectional view taken along line 4—4 of FIG. 2;

FIG. 5 is a fragmentary sectional view taken along line 5—5 of FIG. 4;

FIG. 6 is a sectional view taken along line 6—6 of FIG. 3; and

FIG. 7 is a sectional view taken along line 7—7 of FIG. 3.

DESCRIPTION OF THE ILLUSTRATIVE EMBODIMENT

As required, a detailed illustrative embodiment of the invention is disclosed herein. The embodiment exemplifies the invention which may, of course, be embodied in other forms, some of which may be radically different from the illustrative embodiment. However, the specific structural and functional details disclosed herein are representative and they provide a basis for the claims herein which define the scope of the invention.

Referring initially to FIG. 1, there is represented a gas turbine 12 which is coupled through a bearing 14 to a compressor 16. The turbine 12 and the compressor 16 may take any of a wide variety of different forms, or for that matter they may be entirely different structures, as they serve herein merely to illustrate an application of the bearing 14 which is illustrative of the present invention.

The bearing 14 supports a rotary load-carrying shaft 18, both radially and axially. That is, the bearing 14 incorporates individual axial-support and radially bearing components which support the load of the rotary shaft 18 on fluid cushions. In this regard, gas (under pressure) is provided from a source 20 to the bearing 14, to maintain the fluid-cushion or gas-lubricant support. Specifically, the bearing 14 receives gas through separate ducts 22, 24 and 26 each of which is connected to a different section of the bearing. The central section 28 of the bearing constitutes a thrust-bearing component while the external sections 30 and 32 constitute radial-bearing components. Each of the bearing components in the sections 28, 30 and 32 include a control structure (shown externally as structure 34 for the central section 28) which controls the selective application of fluid streams to impact on the shaft structure and thereby preserve the shaft 18 in an operative position within the bearing 14, maintaining the critical positional relationship for effective gas-lubricated bearing operation.

Referring now to FIG. 3, the separate component sections of the bearing 14 are revealed in structural detail. The similar external sections 30 and 32 provide radial support for the shaft 18 while the central section 28 houses an enlarged annulus or disk 36 (integral with the shaft 18) and operates as a thrust bearing to preserve the shaft 18 in proper axial relationship to the bearing. It is to be noted that gas supplied into a cushion space 35 (between the shaft 18 and the bearing component 30) develops a cushion which actually bears the radial load, applied to the shaft. Somewhat similarly, gas is injected into the spaces 37 (on either side of the disk 36) to provide a thrust cushion. The flow of gas to develop these cushions is somewhat continuous, the gas passing into open spaces 45 to be discharged (as to ambient) through outlet ports 47.

In the composite bearing structure, position control is provided in addition to simply supplying the gas cushions. Specifically, with regard to the end sections 30 and 32 the desired radial position of the shaft 18 is maintained by selectively injecting fluid forcefully through ports 38 to impinge on the cylindrical surface of the shaft 18, so as to maintain the shaft 18 in the desired radial position. Somewhat similarly, the axial position of the shaft is maintained within critical limits by selectively supplying fluid streams through ports 40, which streams act on the opposed flat faces 36a and 36b of the disk 36.

In explaining the central thrust-bearing component section 28, which will be pursued initially, reference will be had somewhat concurrently to FIGS. 2, 3, 4 and 5. In general, as indicated above, the system senses control signals indicative of the instant positional relationship between the disk 36 (FIG. 3) and a flat, circular enclosure defined by a housing 42. Those signals then are applied to the control structure 34 which in turn selectively supplies fluid (gas as specifically described herein) to one of two annular passages 43 from which the gas flows through either the ports 40 or the ports 41 to develop impact forces that appropriately displace the disk 36 axially in order to preserve the desired relationship between the disk 36 and the housing 42.

Analyzing the operation of the structure in somewhat greater detail, the fluid pressure control signals are developed in opposed channels 44 and 46 (FIG. 4) which are axially-aligned cylindrical chambers facing the opposed flat surfaces 36a and 36b of the disk 36. The channels 44 and 46 are sensing holes which operate in cooperation with the disk 36 somewhat in the manner of a flapper valve. That is, a fluid stream is passed through each of the ducts 48 and 50 to the channels 44 and 46 respectively. As the channels 44 and 46 extend parallel to the axis of the disk 36, depending upon the back pressure, the extent to which the disk 36 impedes the flow of gas from the channels, varies substantially as the relative position of the disk 36. In this regard, it is to be noted that open troughs or channels 52 and 54 (FIG. 4 and FIG. 5) are defined on the inside surfaces of the housing 42, and provide ambient or reference-pressure sinks so as to isolate the pressure signals developed in the channels 44 and 46 (FIG. 4) from back pressure or other fluid pressures present within the housing 42. Referring to FIG. 5, it may be seen that fluid flow from the channel 46 results in a pressure signal therein which is dependent substantially entirely on the proximity of the disk 36 (FIG. 4). The provision of the pressure-isolation channels 52 and 54 is exceedingly important to the operation of the system, serving to avoid the presentation of varying back pressures to the channels 44 and 46.

Considering the flow of fluid which develops the control signals, gas is supplied to an inlet 55 top center (FIG. 3) which is an entry into a spool valve cylinder 56. The cylinder 56 contains a spool or slider 58 which defines an elongate, open slot 60 parallel the axis thereof and a pair of somewhat loosely-fitted lands or end closures 62 and 64. The closures 62 and 64 respectively engage axially-aligned coil springs 66 and 68 which are contained at the ends of the cylinder 56. The end walls 69 and 71 of the cylinder 56 contain orifices 70 and 72 that are connected to ducts 48 and 50 which are threadably received in the end walls 69 and 71 respectively. The ducts 48 and 50 are connected from the cylinder 56 to the channels 44 and 46 (FIG. 4) and incorporate threaded elbow couplings 73 and 75 which are received in the housing 42.

Due to the loose fit between the lands or closures 62 and 64 (FIG. 3) of the slider 58 in the cylinder 56, gas may flow through the inlet 55 along the slot 60 in both directions, then past each of the closures 62 and 64, through the orifices 70 and 72 and the ducts 48 and 50 to the channels 44 and 46 (FIG. 4). As indicated above, the channels 44 and 46 function somewhat as flapper nozzles in relation to the disk 36. That is, if the disk 36 is spaced midway between the channels 44 and 46, the pressure therein will be substantially equal. However, in the event that the disk 36 moves closer to either of the channels 44 or 46, the flow out of that channel is restricted with the result that the pressure therein increases. Specifically, for example, if the disk 36 moves to the right the pressure in the channel 44 will drop while that in the channel 46 will increase. These pressure signals are reflected back through the ducts 48 And 50 to the ends of the cylinder 56 (FIG. 3) to control the spool 58. In the example above, the increased pressure in the channel 46 (over that in channel 44) results in a similar pressure differential between the ducts 48 and 50 (FIG. 3) respectively. The higher pressure in the duct 50 is manifest in the cylinder 56 and causes the spool 58 to be displaced to the left.

The position of the spool 58 determines the application of axial, fluid-impact forces to the disk 36. Specifically, continuing to pursue the above example, as the spool 58 is displaced to the left, a groove 74 (left on the spool 58) is displaced to close a port 76; however, a groove 78 (right on the spool 58) is moved into alignment with a mating port 80. As a result, gas then flows from the inlet 55 through the slot 60 about the grooves 78 and out of the port 80 for application through the ports 41 to pRovide a dynamic force on the right surface 36b of the disk 36. As a result, the disk 36 is urged to the left by fluid impact, to thus restore the initial rightward displacement assumed to have occurred. Of course, an assumed initial offset of the disk 36 to the left would result in the reverse sequence of events causing the disk 36 (along with the shaft 18) to be correctively moved to the right.

In the manner described, thrust displacements in either direction are corrected, stabilizing the disk 36 and the shaft 18 within critical position limits. In the operation of the thrust-components bearing section 28 as described above, it is important to note that the pressure signals developed in the pressure-signal channels 44 and 46 (FIGS. 4 and 5) are dependent on the proximity of the disk 36 to the housing 42 and are substantially isolated from various random pressures and fluid currents thereabout. This isolation is accomplished by open channels 52 and 54 which provide reference to ambient pressure about the channels 44 and 46.

Recapitulating, the pressure signals developed in the channels 44 and 46 (FIG. 4) are applied to the control system 34 (FIG. 3) for the development of fluid streams which are supplied through one or the other of the annular passages 43 to the ports 40 or 41 to provide an impact force which correctively positions the disk 36, along with the integral shaft 18. The application of the control signals through the ducts 48 and 50 to the control system 34 may be varied somewhat by compensators 82 (FIG. 2). Specifically, compensators 82, as well known in the prior art may be employed to accomplish a leading, lagging, or leading-lagging effect in the application of the control signals to the control system 34 as is also well known in the prior art. In this regard, various time constants present within the system will of course require the application of design parameters to provide a responsive and stable system. Analysis by computing techniques, as well known in the prior art, may be advisable as part of a system design.

Considering now the similar radial-gas-lubricated bearing sections 30 and 32 positioned on either side of the central section 28, reference will be had somewhat concurrently to FIGS. 3, 6 and 7.

The radial bearing component sections 30 and 32 are structurally similar, being somewhat symmetrical about the central section 28. As a result, the two sections are fully defined by the description of the single section 30 as considered below.

The operational lubricating gas for the radial bearing section 30 is supplied through the duct 22 (FIG. 7) which is threadably engaged in an external annular housing 84. The gas so supplied is received in an annular space 86 (FIGS. 3 and 7) which contains a valve ring 88 having a tongue or ridge 90 thereon that loosely engages grooves in four free, quadrature-related pistons 92 (FIGS. 3 and 7) each of which is supported exteriorly by coil spring 94, held in place by a closure plug 96 that is threadably received in the housing 84. The loose fit of the pistons 92 in their bores as described above, permits the gas that is supplied to the space 86 to flow past the ring 88 and around the piston 92, then through ports 98 to sensing spaces 99 which are contiguous to the shaft 18. The gas so supplied through the ports 98 develops the pneumatic control signals. That is, the pressures developed in the ports 98 (FIG. 3) comprise pressure signals which are utilized to control the position of the pistons 92, in turn controlling the valve ring 88 for selective closure of axial ports 102 which are coupled to the radial ports 38 through which shaft-impacting gas streams are provided to accomplish the desired radial balancing of the shaft 18.

Considering the operation of the radial bearing section 30 in greater detail, gas continuously flows as indicated above, into the annular space 86 (FIG. 7) from which the flow is about the pistons 92 and out of the ports 98 for application to the space defined by the housing 84 (FIG. 3) along with the end-closing housing 104. It is to be noted, that the ports 38 are radially drilled through the housing 104 then closed by means of threadably-received plugs 106.

Pursuing the operation of the system, gas supplied to the annular space 86 (FIGS. 3 and 7) is permitted to flow around the loose-fitting pistons 92 (somewhat emphasized as shown) and through the ports 98 to develop a gas cushion between the enclosure of the housing and the shaft 18. It is to be noted, that spaces 108 (slightly removed axially from the ports 98) are radially relieved so as to define annular ridges 110 about the ports 98. Therefore, the fluid pressure developed within each of the ports 98 is substantially dependent only upon the relative position of each individual port to the shaft 18, the spaces 108 affording a reference pressure. If a shaft 18 moves closer to a particular one of the ports 98, the flow through that port is impeded and the pressure therein increases; however, if movement of the shaft is away from the port, the pressure in the port drops. In this manner, the pressure signals are developed to control the positional relationship of the shaft to the housing.

The pressure levels in each of the ports 98 substantially coincides to the pressure applied at the internal faces of an associated free piston 92. That is, the pressure signals developed in the ports 98 are manifest in the bores 97 in which the pistons 92 are contained. As a result, the pistons 92 (FIG. 7) are variously disposed to align the ring 88 in a relationship with the shaft 18 which is substantially 180° out-of-phase with the instant relationship between the shaft 18 and the housing members 84 and 104. Such displacement of the ring 88 establishes fluid flow through the ports 102 (FIG. 3) to supply gas through the ports 38 to develop forces which preserve the desired relationship of the shaft 18 to its housing.

To consider a specific example, assume that the shaft 18 (FIG. 7) raises with reference to the enclosing support structure. As a result, flow is restricted from the top port 98 with the result that the pressure therein increases thereby causing the top piston 92 to move up (outward in its bore 97.) Due to the connections between the pistons 92 and the ring 88, as the upper piston 92 raises with reference to the housing 84, so does the ring 88. When the ring 88 raises, it opens the upper axial ports 102 (FIG. 6) allowing gas to flow therethrough and out of the upper radial ports 38 to provide impact forces on the upper surface of the shaft 18 which urge the shaft in a downwardly direction. Thus, the assumed upward deviation is corrected by gas impacting on the instant upper surface of the shaft 18 to force it back to a concentric position with the housing.

From the above, it may been that a rotary load member may be servo controlled in accordance with the desired precision relationship between, for example, a shaft and the closure structure with which a gas cushion is developed. Such position control provides a bearing that is stable in operation and which need not be manufactured to the very high-precision standards of prior gas bearing structures.

Of course, the structure hereof may be manufactured in a wide variety of different forms; however, the illustrative embodiment is shown as produced using somewhat conventional machine and metal techniques. Specifically, the separate component sections 28, 30 and 32 comprise machined parts, assembled by well-known techniques and positioned by generally cylindrical spacers 111 and 113 (FIG. 3). Seals are incorporated in the structure, as shown to avoid undesired leakage flows. However, it is to be noted and understood that the structure hereof incorporates means for sensing the positional relationship of the load member to its referenced structure to provide control signals which are employed to control fluid streams e.g. gas streams that are directed to impinge upon the load member in order to restore and preserve the desired positional relationship between the load member and its reference structure. As indicated above the structure hereof may be readily embodied as either a radial bearing unit, a thrust-bearing unit, or a bearing unit incorporating both components whereby to support rotary radial loads and thrust loads. Of course, it is also to be recognized that the system hereof may be incorporated in a structure wherein the central shaft provides the reference member while the exterior member supports the rotary load, e.g. with the gas cushion provided between the two such members.

Of course, various other modifications and deviations may be simply and easily provided in relation to the structure disclosed above.

What is claimed is:

1. A fluid pressure bearing system for supporting a rotary shaft with reference to an annular housing on a cushion of fluid, as from a source of fluid under pressure, comprising:
    a plurality of fluid signal means each including means defining a pressure port which is variously restricted in accordance with the relative position between said shaft and said housing at the location of each pressure port, to thereby provide fluid control signals;
    an annular ring located in a space between said rotary shaft and said housing, to encircle said shaft, said annular ring being controlled by said fluid control signals to be variously positioned in said space;
    a plurality of valve means located about said annular housing for supplying fluid under pressure from said source to provide said cushion;
    and
    means for controlling said valve means by said annular ring whereby to control the fluid flow into said cushion in accordance therewith.

2. A fluid pressure bearing system in accordance with claim 1, further including fluid thrust bearing means for connection to said source.

3. A fluid pressure bearing system according to claim 2 wherein said fluid thrust bearing means includes: means defining at least one flat circular space between said shaft and said housing, which space is perpendicular to the axis of said shaft; means for sensing the thickness of said circular space as a thrust control signal; and thrust bearing valve means controlled by said thrust control signal to vary the pressure in said flat circular space.

4. A fluid pressure bearing system according to claim 1 wherein said fluid signal means include means defining annular ridges about said ports to provide buffer spaces about said fluid signal means.

5. A fluid pressure bearing system according to claim 1 further including spring-biased piston means for controlling said annular ring in accordance with said fluid control signals.

* * * * *